United States Patent
Rangarajan Sridhar et al.

(10) Patent No.: US 11,250,041 B2
(45) Date of Patent: Feb. 15, 2022

(54) EXPANDING INDEXED TERMS FOR SEARCHING FILES

(71) Applicant: Apple Inc., Cupertino, CA (US)

(72) Inventors: Vivek Kumar Rangarajan Sridhar, Sunnyvale, CA (US); Xingwen Xu, Cupertino, CA (US); Vignesh Jagadeesh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 363 days.

(21) Appl. No.: 16/147,444

(22) Filed: Sep. 28, 2018

(65) Prior Publication Data

US 2020/0004836 A1 Jan. 2, 2020

Related U.S. Application Data

(60) Provisional application No. 62/679,885, filed on Jun. 3, 2018.

(51) Int. Cl.
*G06F 16/33* (2019.01)
*G06F 16/13* (2019.01)
*G06F 16/35* (2019.01)
*G06F 16/31* (2019.01)

(52) U.S. Cl.
CPC ......... *G06F 16/3347* (2019.01); *G06F 16/13* (2019.01); *G06F 16/322* (2019.01); *G06F 16/3338* (2019.01); *G06F 16/35* (2019.01)

(58) Field of Classification Search
None
See application file for complete search history.

(56) References Cited

U.S. PATENT DOCUMENTS

| | | | |
|---|---|---|---|
| 2004/0117448 A1 | 6/2004 | Newman et al. | |
| 2013/0013591 A1* | 1/2013 | Hu | G06F 16/58 707/723 |
| 2014/0181204 A1* | 6/2014 | Sharp | H04L 67/22 709/204 |
| 2015/0278200 A1 | 10/2015 | He et al. | |

(Continued)

OTHER PUBLICATIONS

Takase et al., "Fast and Large-scale Unsupervised Relation Extraction", 2015 (Year: 2015).*

(Continued)

*Primary Examiner* — Dawaune A Conyers
(74) *Attorney, Agent, or Firm* — Morgan, Lewis & Bockius LLP (57) ABSTRACT

A device implementing a system for expanded search includes a processor configured to identify plural words, and generate, for each word of the plural words, a word vector based on a proximity of the word relative to other words of the plural words, the word vector comprising plural dimensions. The processor is further configured to create a compressed word vector structure comprising clusters of subsets of the plural dimensions across the word vectors, each cluster including similar values of the respective dimensions, convert the word vectors to points on at least one plane, and partition the at least one plane into nested groupings of the points based on a threshold number of points per nested grouping. The processor is further configured to create a tree look-up structure of the nested groupings, and provide the compressed word vector structure and the tree look-up structure to a client device.

23 Claims, 8 Drawing Sheets

(56) References Cited

U.S. PATENT DOCUMENTS

2016/0103932 A1* 4/2016 Sathish ................ G06F 9/4451
715/767
2018/0052929 A1 2/2018 Liu et al.
2018/0121443 A1* 5/2018 Bao ...................... G06F 40/242

OTHER PUBLICATIONS

Kumar, Chapter 8. Cluster Analysis: Basic Concepts and Algorithms Kumar, Feb. 2, 2018, hereinafter: Kumar) (Year: 2018).*

* cited by examiner

EXPANDING INDEXED TERMS FOR SEARCHING FILES

CROSS-REFERENCE TO RELATED APPLICATIONS

The present application claims the benefit of U.S. Provisional Patent Application Ser. No. 62/679,885, entitled "Expanding Indexed Terms For Searching Files," filed on Jun. 3, 2018, which is hereby incorporated by reference in its entirety for all purposes.

TECHNICAL FIELD

The present description relates generally to file searching, including expanding the number of words that can be used to search for file(s) stored on a device.

BACKGROUND

Files stored on a device may be searched for by one or more word(s). A user may input a query (e.g., a word) at the device in association with a file-based search. The device may return one or more files that relate to the word. For example, a user may input the search query "beach" in association with an image-based search, and the device may return one or more image files that relate to the word "beach."

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A device of a user may store multiple files (e.g., images, videos, documents and/or other types of files associated with the user), and the files may be searched for on the device using one or more associated words. For example, an image file may be designated or labeled (e.g., via metadata) with a respective word(s) which can be used to search a device file system for the image file. Thus, the user can query the device with the word, and the device may provide the corresponding image file as a result to the query.

However, the number of words designated to search for a file may be limited. For example, an image file depicting a beach scene may be searched for by the word "beach," based on a prior designation associating the word "beach" with the file. However, the file may not be searched for by other words such as "sand," "ocean" and/or "shore," since there is no designated association between the other words and the file.

The subject system provides for expanding the number of words used to search for file(s) stored on a device. In doing so, the subject system generates data structures (e.g., a compressed word vector structure and a tree look-up structure) for local storage on the device, where the data structures facilitate in determining additional words used to search for the respective files.

In one or more implementations, the subject system provides for identifying multiple words (e.g., from a corpus of data) and generating, for each word, a word vector based on a proximity of the word relative to other words of the multiple words in the corpus of data, the word vector having multiple dimensions. A compressed word vector structure is created with clusters of subsets of the multiple dimensions across the word vectors, where each cluster includes similar values of the respective dimensions. The word vectors are converted to points on at least one plane, and the at least one plane is partitioned into nested groupings of the points based on a threshold number of points per nested grouping. A tree look-up structure is created from the nested groupings, and the compressed word vector structure and the tree look-up structure are provided to a device.

The device may receive and store the compressed word vector structure and the tree look-up structure, and use these structures to expand the number of words used to search for files stored on the device. For example, as part of a file indexing process, the device may query the tree look-up structure with a word already designated to search for a file (e.g., "beach" for a beach image). In another example, a user of the device may input the query (e.g., a spoken query, a text-based query, or the like). In response, the tree look-up structure, in conjunction with the compressed word vector structure, may provide additional words that are related to the word from the query, and the device may designate the additional words as words to use in searching for the file.

Thus, the subject system provides for expanding the number of words used to search for files. Once the data structures are received and stored on the device, the expanded search capability may be available without network access. Further, user queries for files are not sent to a server, thereby maintaining user privacy. Moreover, by virtue of using a compressed data structure, storage space on the device may be preserved, and by virtue of using a tree look-up structure, the amount of processing time and resources associated with the indexing may be reduced.

Figure 1:
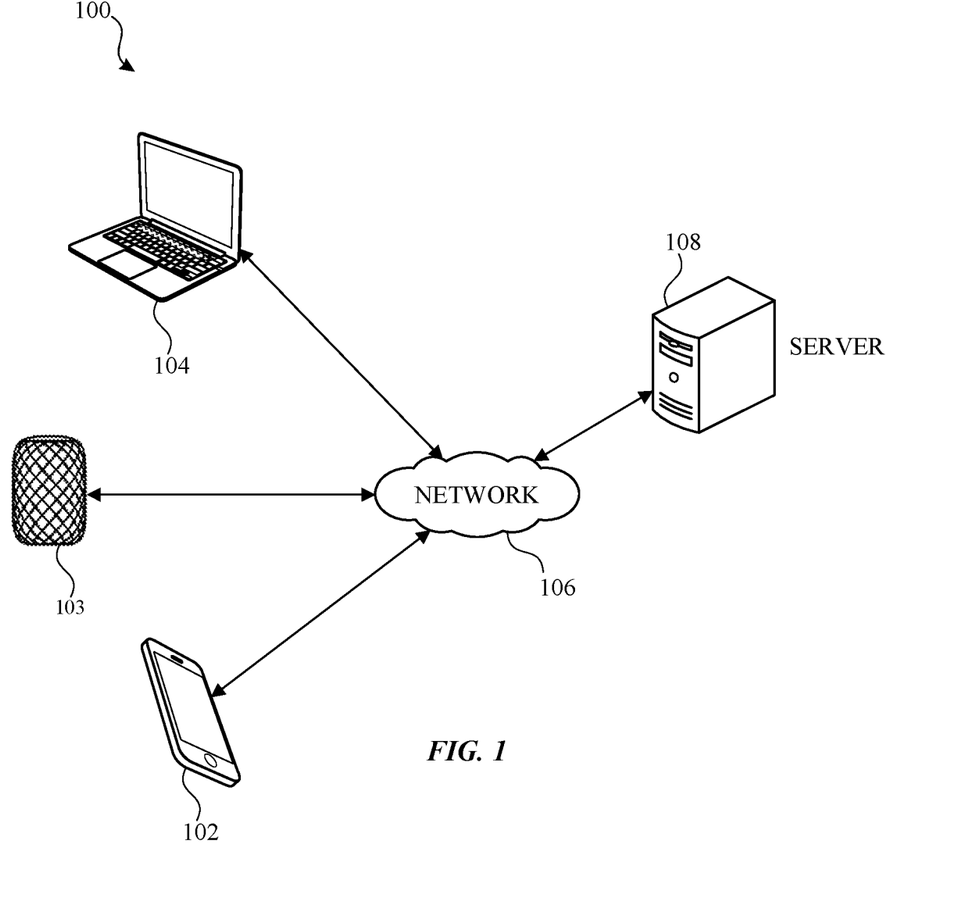
FIG. 1 illustrates an example network environment for expanding the number of words used to search for files in accordance with one or more implementations.

FIG. 1 illustrates an example network environment for expanding the number of words used to search for files in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106 and a server 108. The network 106 may communicatively (directly or indirectly) couple, for example, any two or more of the electronic devices 102-104 and/or the server 108. In one or more implementations, the network 106 may be an interconnected network of devices that may include, or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 103 is depicted as a smart speaker, and the electronic device 104 is depicted as a laptop computer. Each of the electronic devices 102-104 may be, and/or may include all or part of the device discussed below with respect to FIG. 2, and/or the electronic system discussed below with respect to FIG. 8.

The server 108 may be, and/or may include all or part of the device discussed below with respect to FIG. 2, and/or the electronic system discussed below with respect to FIG. 8. The server 108 may include one or more servers, such as a cloud of servers. For explanatory purposes, a single server 108 is shown and discussed with respect to various operations, such generating a compressed word vector structure and a tree look-up structure, and providing these structures to the electronic devices 102-104. However, these and other operations discussed herein may be performed by one or more servers, e.g., at one or more different data centers, and each different operation may be performed by the same or different servers.

Figure 2:
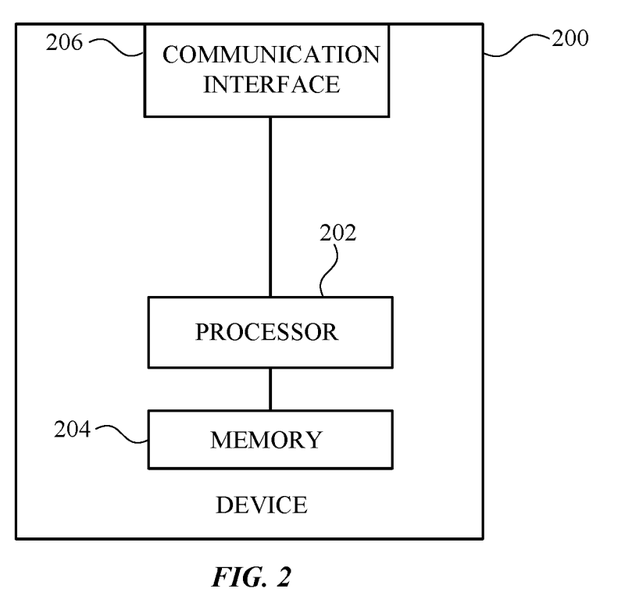
FIG. 2 illustrates an example device that may implement a system for expanding the number of words used to search for files in accordance with one or more implementations.

FIG. 2 illustrates an example device that may implement a system for expanding the number of words used to search for files in accordance with one or more implementations. For example, the device 200 of FIG. 2 can correspond to any of the electronic devices 102-104, or to the server 108 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, and a communication interface 206. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200. In the subject system, the processor 202 may implement software architecture for expanding the number of words used to search for files as discussed further below with respect to FIGS. 3-5.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, in a case where the device 200 corresponds to one of the electronic devices 102-104, the memory 204 may store files such as images, videos, documents and the like. The memory 204 may also store a compressed word vector structure and a tree look-up structure, which may be queried to determine words used to search for the files stored on the device.

In one or more implementations, in a case where the device 200 corresponds to the server 108, the memory 204 may store logic for creating the compressed word vector structure and tree look-up structure described herein.

The communication interface 206 may include suitable logic, circuitry, and/or code that enables wired or wireless communication, such as between any of the electronic devices 102-104 and the server 108 over the network 106. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
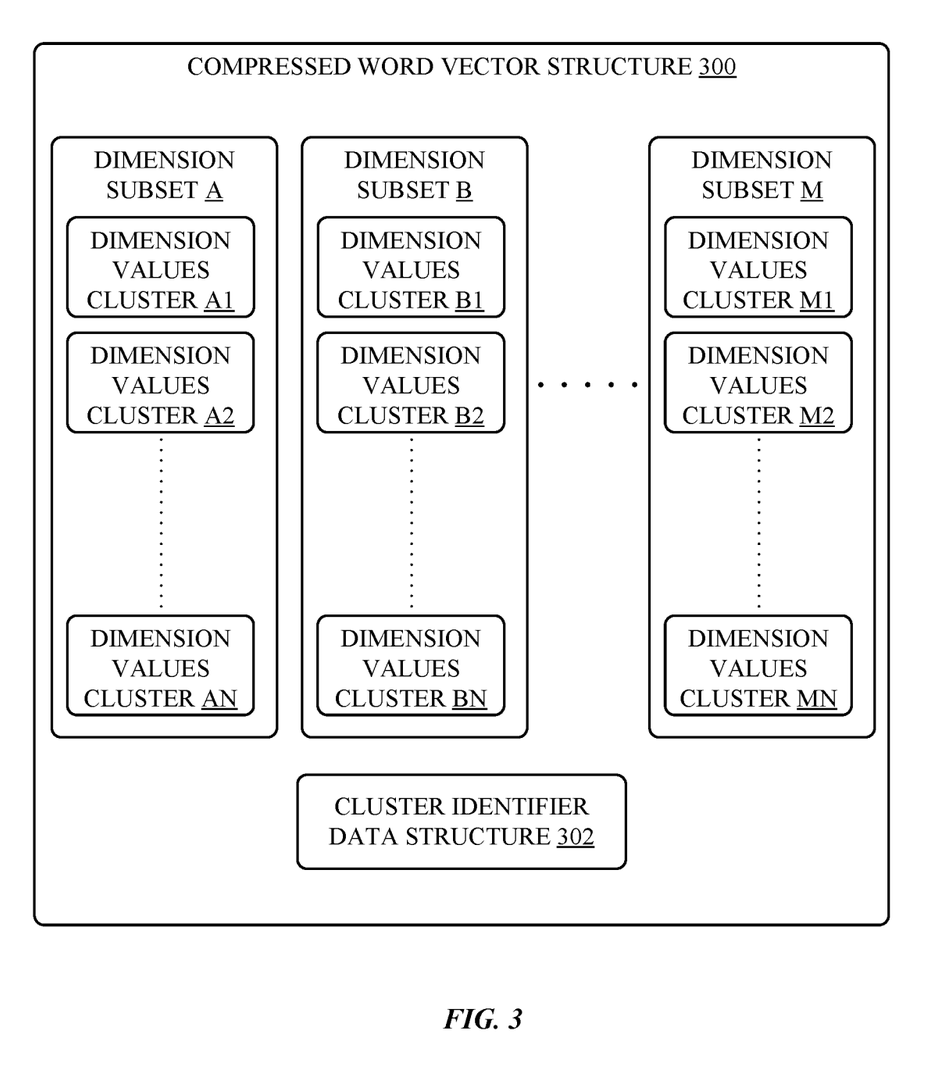
FIG. 3 illustrates an example of a compressed word vector structure in accordance with one or more implementations.

FIG. 3 illustrates an example of a compressed word vector structure 300 in accordance with one or more implementations. While FIG. 3 is described with reference to the server 108 and the electronic device 102, any of the electronic devices 103-104 may apply instead. The compressed word vector structure 300 can be generated by one or more software modules running on the processor 202 of the server 108 and/or any other device (e.g., any of the electronic devices 102-104). In another example, the compressed word vector structure 300 can be generated by one or more software modules implemented by custom hardware (e.g., one or more coprocessors).

To expand the number of words used to search for files for the electronic device 102, the server 108 may determine one or more words that are related to a given word (e.g., a word already designated to search for a file). In this regard, the server 108 may obtain a vocabulary of words from a corpus of data (e.g., a collection of documents from which relationships between words may be determined). For example, the corpus of data may provide a vocabulary of 100,000 words.

The server 108 may convert each word from the corpus of data into a respective word vector, where each word vector represents a "meaning" of a word based on its context or surrounding words from within the corpus of data. In addition, each word vector may be multi-dimensional. For example, the server 108 may consider 300 different aspects (e.g., contextual aspects) for each word with respect to the corpus of data, resulting in a word vector of 300 dimensions per word. By comparing the dimensional values between words, the server 108 may determine which words are proximate to each other in the corpus of data. As a result, words determined to be proximate to each other in the corpus of data may be related to each other. For example, related words may have the same or similar meaning (e.g., "ocean" and "sea"). Alternatively or in addition, related words may not have the same meaning but be contextually similar (e.g., "mother" and "baby").

In one or more implementations, the server 108 may prune the vocabulary of words initially obtained from the corpus of data by removing words corresponding to functional words. For example, words appearing within a predefined list of functional words (e.g., "on," "to," "the," "a" and the like) may be removed from the vocabulary initially obtained from the corpus of data.

As noted above, the compressed word vector structure 300 may store a representation of all words within a vocabulary (e.g., after pruning) together with their respective word vectors. Without compression, the storage of a 100,000 word vocabulary with a 300-dimensional vector per word may require a significant amount of memory, particularly for storage on the electronic devices 102-104.

In one or more implementations, the server 108 may create the compressed word vector structure 300 by the dividing the multiple dimensions into predefined subsets of dimensions. As shown in the example of FIG. 3, and using the example of 300 dimensions, the compressed word vector structure 300 includes the dimension subset A, the dimension subset B, . . . , and the dimension subset M (hereinafter the "dimension subsets A-M"), where M=60. Thus, each of the dimension subsets A-M is associated with 5 respective dimensions of the 300 dimensions per word vector.

In addition, the server 108 may divide each of the dimension subsets A-M into a predefined number of clusters. Each cluster may specify a value (e.g., or value range) for each of its respective dimensions (e.g., 5 dimensions). In turn, the sever 108 may assign each word to a cluster based on the respective 5 dimension values of that word corresponding to those values (e.g., or value ranges) specified for the cluster.

As shown in the example of FIG. 3, the compressed word vector structure 300 includes N clusters per dimension subset. For example, dimension subset A has dimension values clusters A1-AN, dimension subset B has dimension values clusters B1-BN, . . . , and dimension subset M has dimension values cluster M1-MN. Using an example of N=256 (e.g., 256 clusters), each dimension values cluster specifies a respective value (e.g., or value range) for the 5 dimensions in the corresponding dimension subset. With the example vocabulary of 100,000 words, each word of the 100,000 words is assigned to a respective cluster for each of the dimension subsets A-M, based on the dimension values of the word with respect to the dimension subset.

For example, the word "beach" may be assigned to: cluster A20 of dimension subset A (e.g., based on the 5 dimensional values of the word vector for "beach" corresponding with those specified for cluster A20), cluster B135 of dimension subset B, . . . , and cluster M13 of dimension subset M. The server 108 may store a set of cluster identifiers in association with each word (e.g., A20, B135, . . . , M13 for the word "beach"), and store all sets of cluster identifiers in a cluster identifier data structure 302. Thus, the cluster identifier data structure 302 may be used to obtain the respective word vector associated with a given word, and/or to obtain the respective word associated with a given word vector. In one or more implementations, the cluster identifier data structure 302 may correspond to a set of vectors that identifies the respective clusters for each word.

The compressed word vector structure 300 may reduce the storage space required to store words and their associated word vectors. Using the example of 256 clusters (e.g., N=256), it is possible to identify a specific cluster (e.g., one of dimension values cluster A1-AN) in a dimension subset (e.g., dimension subset A) using 1 byte. As such, the set of identifiers for a single word may be represented by M bytes, each of which identifies a respective cluster for the dimension subsets A-M. Using the above-described example of a 100,000 word vocabulary with 300 dimensions per word, the compressed word vector structure 300 with 60 dimension subsets (e.g., M=60) and 256 dimension values clusters (e.g., N=256) may require approximately 6 MB of storage space. On the other hand, a technique without such compression may require 120 MB of storage space, for the same 100,000 word vocabulary with 300 dimensions per word.

In one or more implementations, the compressed word vector structure 300 (including its corresponding components dimension subsets A-M, dimension values clusters A1-AN, B1-BN, . . . , M1-MN) may be stored in memory 204 of the server 108. The server 108 may provide the compressed word vector structure 300, including the cluster identifier data structure 302, together with a tree look-up structure (discussed below with respect to FIG. 4) to any of the electronic device 102-104. Additional features and functions of the compressed word vector structure 300 according to various aspects of the subject technology are further described in the present disclosure.

Figure 4:
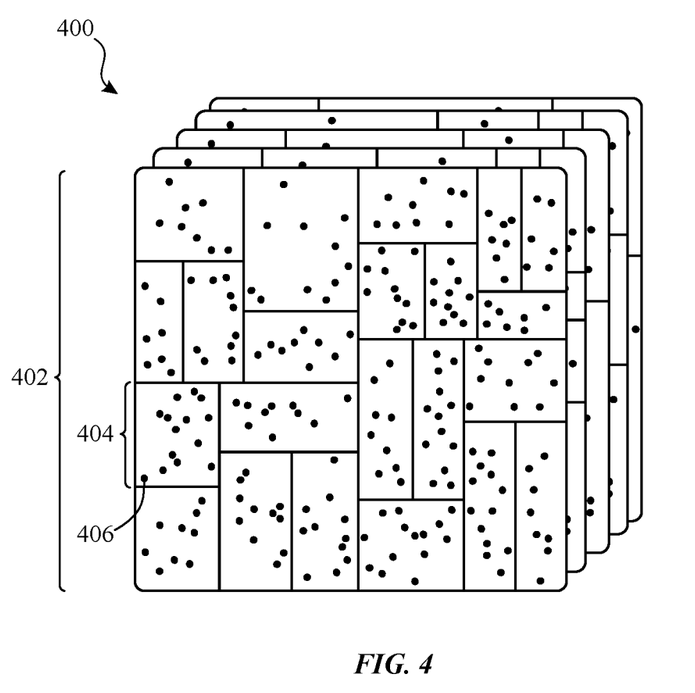
FIG. 4 illustrates an example of a partitioned vector space associated with a tree look-up structure in accordance with one or more implementations.

FIG. 4 illustrates an example of a partitioned vector space 400 associated with a tree look-up structure in accordance with one or more implementations. While FIG. 4 is described with reference to the server 108 and the electronic device 102, any of the electronic devices 103-104 may apply instead. The tree look-up structure (e.g., element 504, discussed below with reference to FIG. 5) associated with the partitioned vector space 400 can be generated by one or more software modules running on the processor 202 of the server 108 and/or any other device (e.g., any of the electronic devices 102-104). In another example, the tree look-up structure 504 can be generated by one or more software modules implemented by custom hardware (e.g., one or more coprocessors).

The tree look-up structure 504 may facilitate in the searching and/or the indexing of files stored on the device. As described above, words may be determined to be related to each other by comparing the respective dimensional values of word vectors corresponding to the words. For example, one technique for determining if words are related to each other may be to individually calculate the distance of each word to all other words in a vocabulary based on dimensional values. However, with a large vocabulary (e.g., 100,000 words), this technique may be slow and computationally expensive.

In one or more implementations, the partitioned vector space 400 may be used in conjunction with a k-nearest neighbors algorithm (k-NN). In this regard, the partitioned vector space 400 may represent k dimensions. For a given point (e.g., point 406) in the partitioned vector space 400, values for the k dimensions may be determined (e.g., extracted) based on the position of that point in the partitioned vector space 400. In addition, nearest neighbors for the point can be determined based on their respective positions relative to the point in the partitioned vector space 400.

The server 108 may initially convert the above-described word vectors, each corresponding to a respective word in the vocabulary, to points in the partitioned vector space 400. In the example of FIG. 4, the partitioned vector space 400 is divided into five planes (e.g., plane 402 is one of the five planes). In its conversion, the server 108 positions the points within the partitioned vector space 400 (e.g., corresponding to k dimensions) based on the dimensional values of the word vectors corresponding to the points.

After converting all of the word vectors to points, the server 108 performs partitioning of the vector space, for example, based on the distribution of the points. The partitioning may be performed using a light-weight clustering technique for an approximate and even distribution of the points. The partitioning may be performed in a recursive manner, so as to create nested groupings of the points. The server 108 may stop partitioning when the number of points per nested grouping reaches a threshold number of points (e.g., 60 points per nested grouping).

Thus, in the example of FIG. 4, the plane 402 is one of five planes within the partitioned vector space 400. The plane is partitioned into nested groupings of points based on the threshold number of points per nested grouping. For example, the grouping 404 represents one nested grouping of points which meets the threshold number of points (e.g., the number of points in the grouping 404 is equal to or less than the threshold number of points per nested grouping).

The server 108 may create a tree look-up structure (e.g., the tree look-up structure 504 of FIG. 5) based on the partitioned vector space 400. For example, the tree look-up structure 504 may consider each plane of the partitioned vector space 400 as a respective binary tree, and traverse the trees based on the dimensional values for a particular word vector. For example, the tree look-up structure 504 may initially select one of the five trees (e.g., respectively corresponding to the planes of the partitioned vector space 400) based on a subset of dimension values of the word vector. The tree look-up structure 504 may traverse the selected tree using the remaining dimension values of the word vector, and continue such traversal until a terminal nested grouping (e.g., the grouping 404) is reached.

The server 108 may then calculate distances (e.g., using a cosine distance function) of the word vector (e.g., represented by point 406) relative to the other word vectors in the nested grouping (e.g., the other points in the nested grouping 404), in order to determine a predefined number word vectors corresponding to nearest neighbor words. For example, if the nested grouping 404 were to include 60 points, the server 108 may calculate distances of the point 406 relative to the 59 remaining points, and return a predefined number of points (e.g., 10 points) with the smallest distance values.

To determine the corresponding words for each of the 10 points, the server 108 may first determine a word vector for each point by extracting the k dimensions for the point based on the position of the point in the partitioned vector space 400. The server 108 may then access (e.g., query) the compressed word vector structure 300 (including the cluster identifier data structure 302) based on the word vector, in order to obtain the words corresponding to each point. These words (e.g., 10 words) may correspond to words that are related to the word represented by point 406.

In one or more implementations, the compressed word vector structure 300 (including its corresponding components dimension subsets A-N, dimension values clusters A1-AN, B1-BN, . . . , M1-MN) may be stored in memory 204 of the server 108, and the server 108 may provide the compressed word vector structure 300 to any of the electronic device 102-104. Additional features and functions of the compressed word vector structure 300 according to various aspects of the subject technology are further described in the present disclosure.

Figure 5:
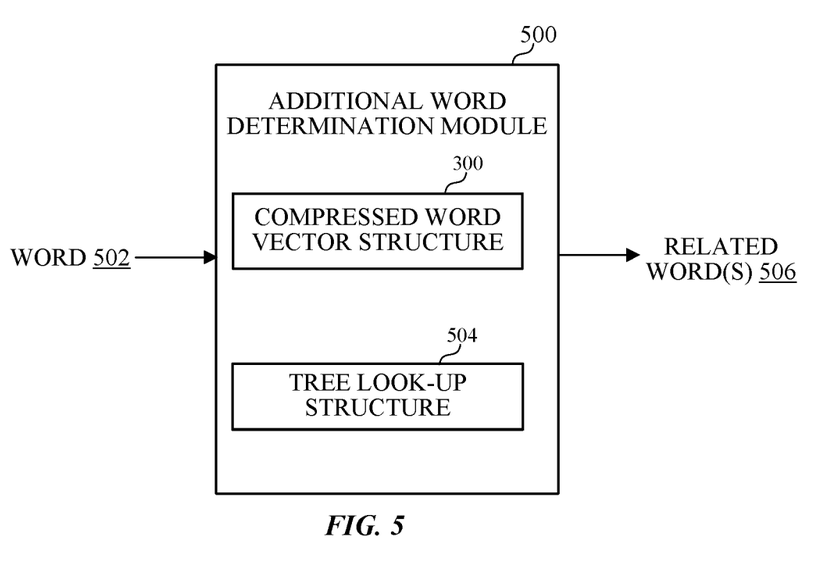
FIG. 5 illustrates an example of an additional word determination module for expanding the number of words used to search for files in accordance with one or more implementations.

FIG. 5 illustrates an example of an additional word determination module 500 for expanding the number of words used to search for files in accordance with one or more implementations. For example, the additional word determination module 500 can be implemented by one or more software modules running on the processor 202 of the electronic device 102. While FIG. 5 is described with reference to the electronic device 102, any of the electronic devices 103-104 may apply instead. The additional word determination module 500 can be implemented by one or more software modules implemented by custom hardware (e.g., one or more coprocessors). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The additional word determination module 500 receives a word 502 as input and provides related word(s) 506 as output. In addition, additional word determination module 500 includes the compressed word vector structure 300 described above with respect to FIG. 3, and the tree look-up structure 504 corresponding to the partitioned vector space 400 described above with respect to FIG. 4.

As noted above, the server 108 may generate the compressed word vector structure 300 and the tree look-up structure 504. In addition, the server 108 may send the compressed word vector structure 300 (including the cluster identifier data structure 302) and the tree look-up structure 504 to the electronic device 102, for example, via the network 106. Alternatively, the electronic device 102 may be configured to generate the compressed word vector structure 300 and the tree look-up structure 504 (e.g., locally). The electronic device 102 may store each of the compressed word vector structure 300 and the tree look-up structure 504 (e.g., as received from the server 108, or as locally generated) in the memory 204 of the device.

The electronic device 102 may access the compressed word vector structure 300 (including the cluster identifier data structure 302) and the tree look-up structure 504, for example, to expand the number of words used to search for files (e.g., images, videos, documents and/or other types of files associated with the user) stored on the electronic device 102. For example, the electronic device may perform a file indexing process based on a defined schedule (e.g., every night, and/or upon detection of the electronic device 102 being plugged in). As part of the file indexing process, the electronic device 102 may access metadata for each file to determine one or more words that are already designated for searching for the file (e.g., "beach" for a beach image). The electronic device may query the tree look-up structure 504 with the one or more words. In response to the query/queries, the tree look-up structure 504, in conjunction with the compressed word vector structure 300 (and the cluster identifier data structure 302), may provide additional words (e.g., "sand," "ocean," "shore") that are related to the one or more words of the query/queries. The electronic device 102 may designate the additional words as words that can also be used to search for the respective files. In another example, a user may query the electronic device 102, for example, via a spoken query, a text-based query, or the like. The word(s) from the query may be used to query the tree look-up structure 504, which in conjunction with the compressed word vector structure 300 (and the cluster identifier data structure 302), may provide additional words that are related to the word(s) of the user query.

Thus, prior to receiving the compressed word vector structure 300 and the tree look-up structure 504, a user of the electronic device 102 may not receive a response to an image-based search query for the word "shore." For example, an image file depicting a beach scene may only be associated with the word "beach," based on a prior designation associating the word "beach" with the file. However, after receiving the compressed word vector structure 300 and the tree look-up structure 504, the electronic device 102 may index its stored files, and create new designations for words and the files. Then, the user at the electronic device 102 may receive the image file depicting the beach, as well as any additional files (e.g., based on the file indexing), in response to the query "shore."

Thus, the subject system provides for expanding the number of words used to search for files stored on the electronic device 102. Once the compressed word vector structure 300 (including the cluster identifier data structure 302) and the tree look-up structure 504 have been received by the electronic device 102, the expanded search capability may be available without network access. Further, queries for files input by the user at the electronic device 102 are not sent to the server 108, thereby maintaining user privacy. Moreover, by virtue of using a compressed data structure (e.g., the compressed word vector structure 300), storage space on the electronic device 102 may be preserved.

In one or more implementations, the additional word determination module 500, the compressed word vector structure 300 and the tree look-up structure 504 are implemented via software instructions, stored in the memory 204, which when executed by the processor 202, cause the processor 202 to perform particular function(s).

In one or more implementations, one or more of the additional word determination module 500, the compressed word vector structure 300 and the tree look-up structure 504 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 6:
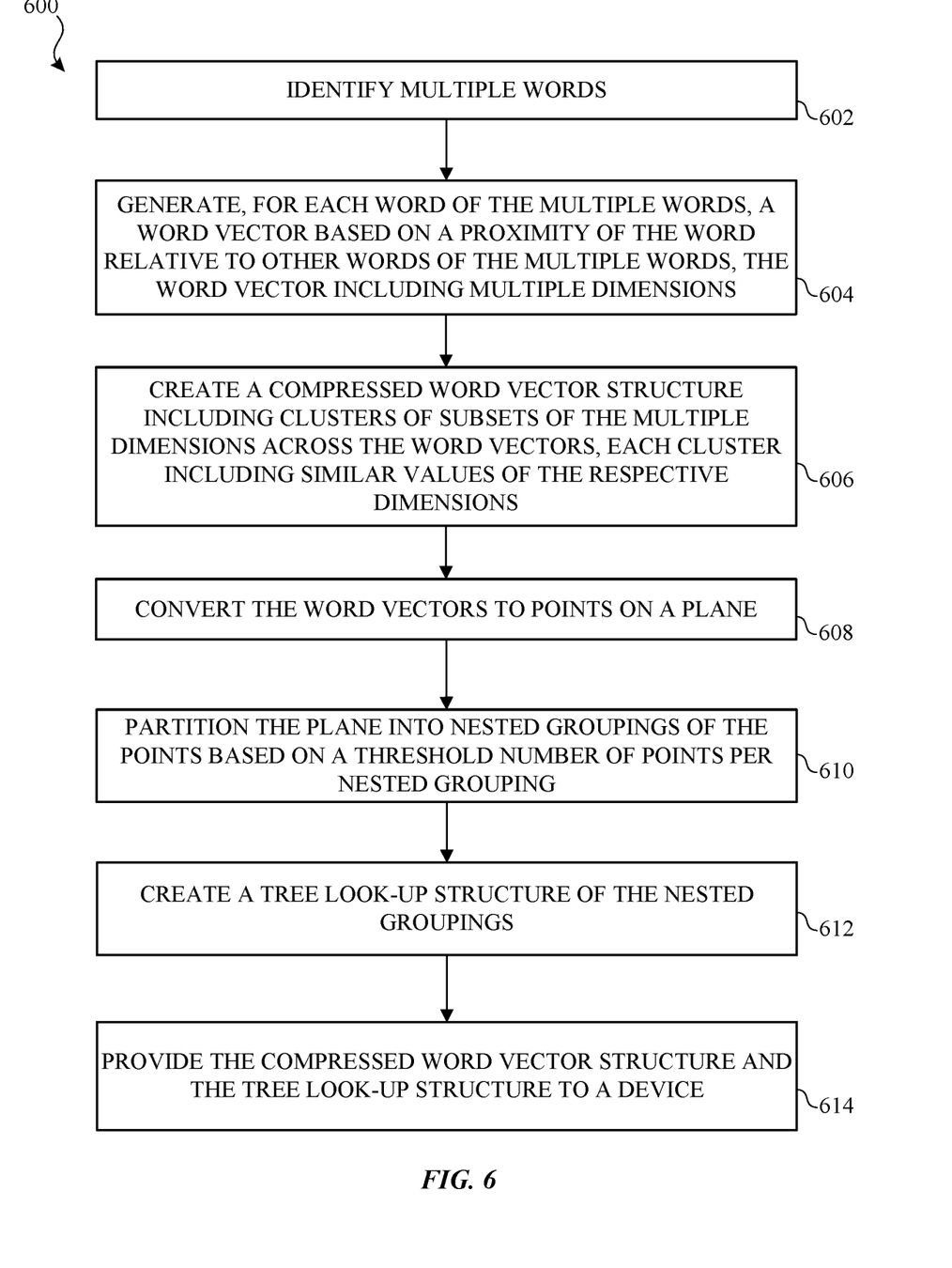
FIG. 6 illustrates an example process for expanding the number of words used to search for files in accordance with one or more implementations.

FIG. 6 illustrates an example process for expanding the number of words used to search for files in accordance with one or more implementations. For explanatory purposes, the process 600 is primarily described herein with reference to the server 108 and the electronic device 102 of FIG. 1. However, the process 600 is not limited to the server 108 and the electronic device 102 and for example, can apply to the server 108 and any of the electronic devices 103-104. Moreover, one or more blocks (or operations) of the process 600 may be performed by one or more other components of the electronic device 102, the server 108 and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

The server 108 identifies multiple words, for example, from a corpus of data (602). For each word of the multiple words, the server 108 generates a word vector based on a proximity of the word relative to other words of the multiple words in the corpus of data, the word vector having multiple dimensions (604).

The server 108 creates a compressed word vector structure 300 including clusters of subsets of the multiple dimensions across the word vectors, each cluster including similar values of the respective dimensions (606). Each of the subsets of the multiple dimensions may include the same number of clusters (e.g., 256 clusters per dimension subset).

The server 108 converts the word vectors to points on at least one plane (608). The server 108 partitions the at least one plane into nested groupings of the points based on a threshold number of points per nested grouping (610). The server 108 creates a tree look-up structure 504 of the nested groupings (612).

The server 108 provides the compressed word vector structure 300 and the tree look-up structure 504 to the electronic device 102 (614). The compressed word vector structure 300 and the tree look-up structure 504 may be stored locally on the electronic device 102.

The compressed word vector structure 300 and the tree look-up structure 504 may be configured to be accessed by the electronic device 102, to increase a number of words that can be used to search for a file stored on the electronic device 102. The file may be an image file, and identifying the words may include selecting words that relate to images (e.g., removing functional words).

The file may be searched for by matching metadata of the file with a first word (e.g., within a file system, based on prior file indexing), and the electronic device 102 may be configured to query the tree look-up structure 504 with the first word, to determine at least one second word to designate for searching for the file (e.g., as part of a file indexing process). The tree look-up structure 504, in conjunction with the compressed word vector structure 300 (and cluster identifier data structure 302), may be configured to determine the at least one second word related to the first word.

Figure 7:
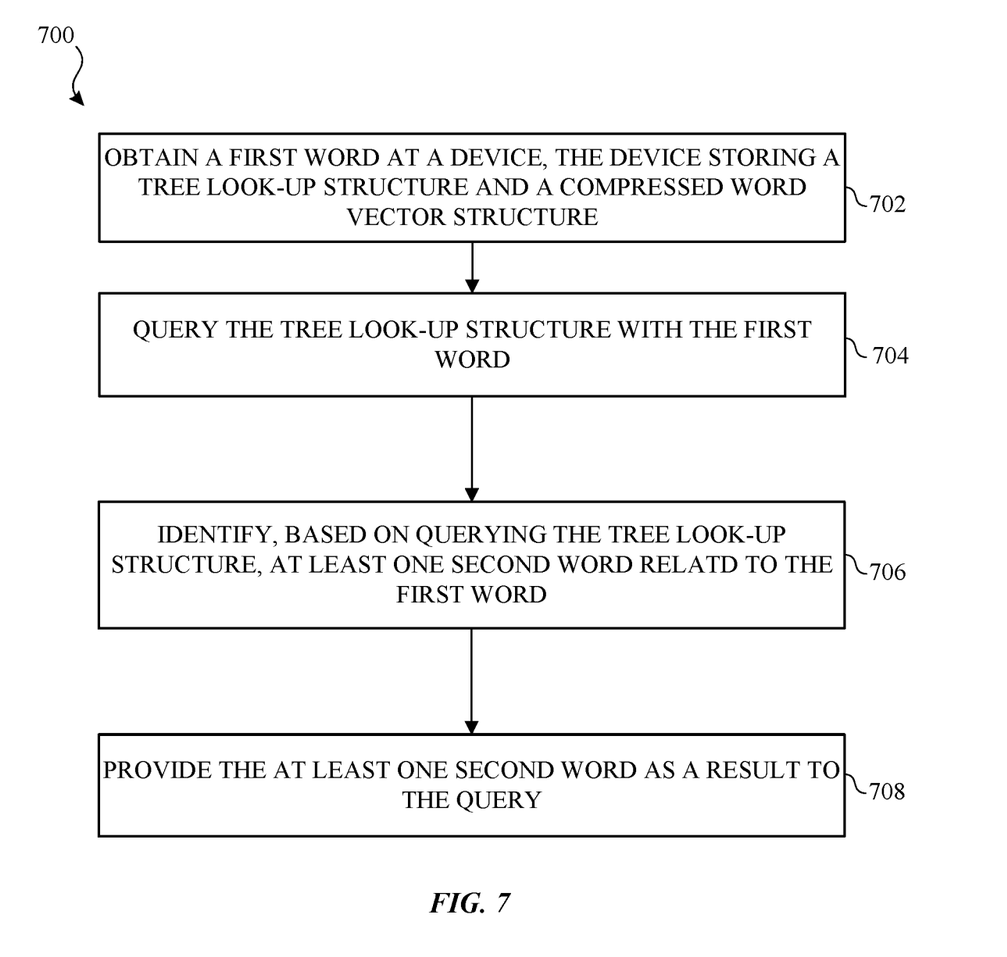
FIG. 7 illustrates another example process for expanding the number of words used to search for files in accordance with one or more implementations.

FIG. 7 illustrates another example process for expanding the number of words used to search for files in accordance with one or more implementations. For explanatory purposes, the process 700 is primarily described herein with reference to the electronic device 102 and the server 108 of FIG. 1. However, the process 700 is not limited to the electronic device 102 and the server 108 and for example, can apply to any of the electronic devices 103-104 and the server 108. Moreover, one or more blocks (or operations) of the process 700 may be performed by one or more other components of the server 108, the electronic device 102 and/or by other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102 obtains a first word (e.g., as part of a file indexing process), the electronic device 102 storing a tree look-up structure 504 and a compressed word vector structure 300 (702). The electronic device 102 queries the tree look-up structure 504 with the first word (704).

The tree look-up structure 504 includes nested groupings of points which represent words (e.g., identified by the server 108 from a corpus of data) and which are partitioned based on a threshold number of points per nested grouping. Each word is associated with a word vector that indicates a proximity of the word relative to other words in the corpus of data, each word vector including multiple dimensions. The compressed word vector structure 300 includes clusters of subsets of the multiple dimensions across the word vectors, each cluster including similar values of the respective dimensions. Each of the subsets of the multiple dimensions may include the same number of clusters (e.g., 256 clusters per dimension subset).

The compressed word vector structure 300 and the tree look-up structure 504 may be configured to be accessed by the electronic device 102, to increase a number of words by which a file stored on the electronic device 102 may be searched for (e.g., as part of the file indexing process). The filed stored on the electronic device 102 may be searched for by matching metadata of the file with the first word. Thus, the electronic device 102 identifies, based on querying the tree look-up structure 504, at least one second word related to the first word (706), and provides the at least one second word as a result to the query (708).

The electronic device 102 may designate the at least one second word to also search for the file, thereby expanding the number of words for searching for the file. For example, the file may be an image file, and the server 108 may have identified the words by selecting words that relate to images (e.g., by removing functional words).

As described above, one aspect of the present technology is the gathering and use of data available from various sources to improve file searching. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide for expanded search capabilities for device files. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be based on non-personal information data or a bare minimum amount of personal information, such as the content being requested by the device associated with a user, other non-personal information, or publicly available information.

Figure 8:
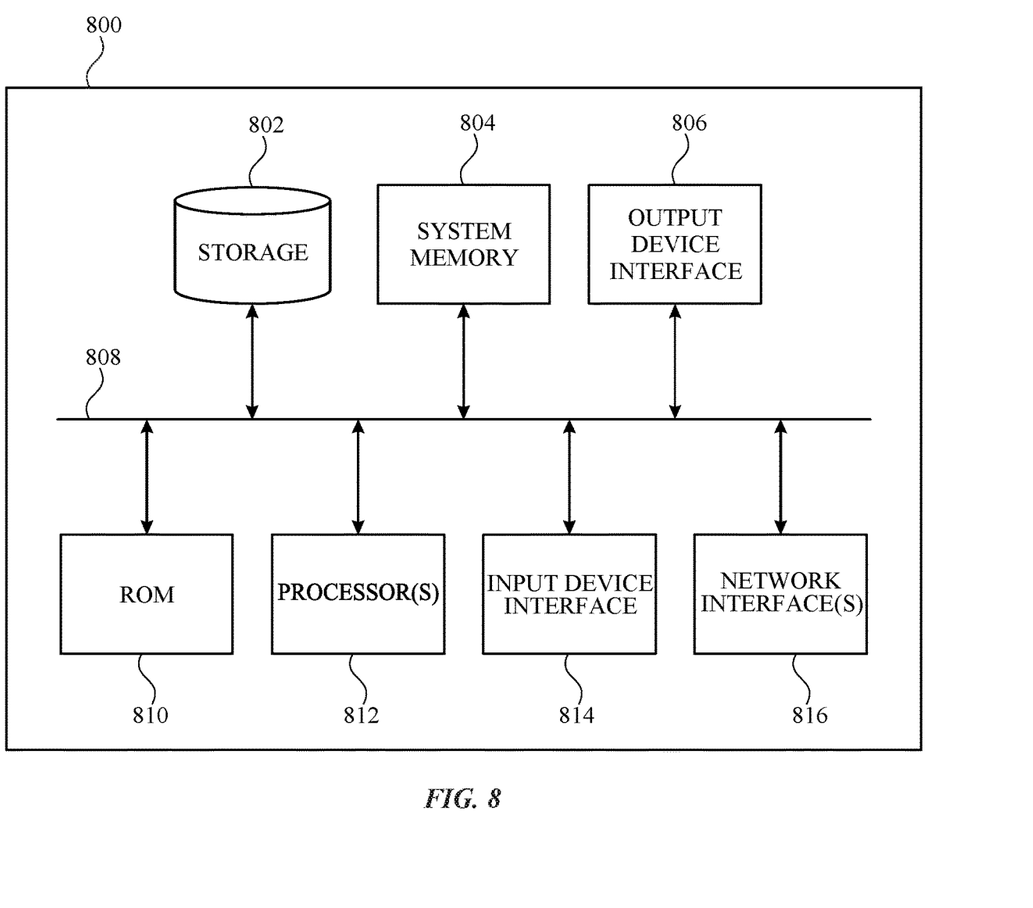
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-104, and/or one or the server 108 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of files generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the server 108 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
at least one processor; and a memory including instructions that, when executed by the at least one processor, cause the at least one processor to:
- identify plural words in a corpus of data;
- generate, for each word of the plural words, a word vector based on a proximity of the word relative to other words of the plural words in the corpus of data, the word vector comprising plural dimensions;
- create a compressed word vector structure comprising clusters of subsets of the plural dimensions across the word vectors, each cluster including similar values of the respective dimensions;
- convert the word vectors to points on at least one plane;
- partition the at least one plane into nested groupings of the points based on a threshold number of points per nested grouping;
- create a tree look-up structure of the nested groupings; and
- provide the compressed word vector structure and the tree look-up structure to a client device.

2. The device of claim 1, wherein the compressed word vector structure and the tree look-up structure are configured to be accessed by the client device, to increase a number of words for searching for a file stored on the client device.

3. The device of claim 2, wherein the file is an image file, and wherein identifying the words comprises selecting words from the corpus of data that relate to images.

4. The device of claim 2, wherein the file may be searched for by matching metadata of the file with a first word, and
wherein the client device is configured to query the tree look-up structure with the first word, to determine at least one second word for searching for the file.

5. The device of claim 4, wherein the tree look-up structure, in conjunction with the compressed word vector structure, is configured to determine the at least one second word which is related to the first word.

6. The device of claim 4, wherein the client device is configured to query the tree look-up structure with the first word as part of a file indexing process.

7. The device of claim 1, wherein the compressed word vector structure and the tree look-up structure are stored locally on the client device.

8. The device of claim 1, wherein each of the subsets of the plural dimensions comprises the same number of clusters.

9. A computer program product comprising code stored in a tangible computer-readable storage medium, the code comprising:
- code to identify words from a corpus of data;
- code to generate, for each word, a word vector based on a proximity of the word relative to other words in the corpus of data, the word vector comprising plural dimensions;
- code to create a compressed word vector structure comprising clusters of subsets of the plural dimensions across the word vectors, each cluster including similar values of the respective dimensions;
- code to convert the word vectors to points on at least one plane;
- code to partition the at least one plane into nested groupings of the points based on a threshold number of points per nested grouping;
- code to create a tree look-up structure of the nested groupings; and
- code to provide the compressed word vector structure and the tree look-up structure to a device.

10. The computer program product of claim 9, wherein the compressed word vector structure and the tree look-up structure are configured to be accessed by the device, to increase a number of words for searching for a file stored on the device.

11. The computer program product of claim 10, wherein the file is an image file, and wherein identifying the words comprises selecting words that relate to images.

12. The computer program product of claim 10, wherein the file may be searched for by matching metadata of the file with a first word, and
wherein the device is configured to query the tree look-up structure with the first word, to determine at least one second word for searching for the file.

13. The computer program product of claim 12, wherein the tree look-up structure, in conjunction with the compressed word vector structure, is configured to determine the at least one second word which is related to the first word.

14. The computer program product of claim 12, wherein the device is configured to query the tree look-up structure with the first word as part of a file indexing process.

15. The computer program product of claim 9, wherein the compressed word vector structure and the tree look-up structure are stored locally on the device.

16. A method comprising:
- obtaining a first word at a device, the device storing a tree look-up structure;
- querying the tree look-up structure with the first word, wherein the tree look-up structure comprises nested groupings of points which represent words and which are partitioned based on a threshold number of points per nested grouping, and
wherein each word is associated with a word vector that indicates a proximity of the word relative to other words, each word vector comprising plural dimensions,
- identifying, based on the query to the tree look-up structure, at least one second word related to the first word; and
- providing the at least one second word as a result to the query.

17. The method of claim 16, wherein a file may be searched for by matching metadata of the file with the first word.

18. The method of claim 17, further comprising:
- designating the at least one second word as a word for searching for the file.

19. The method of claim 18, wherein the obtaining, the querying, the identifying, the providing and the designating are performed as part of a file indexing process for the device.

20. The method of claim 16, wherein the device further stores a compressed word vector structure comprising clusters of subsets of the plural dimensions across the word vectors, each cluster including similar values of the respective dimensions.

21. The method of claim 20, wherein the device generates the tree look-up structure and the compressed word vector structure.

22. The method of claim 16, wherein the first word corresponds to an input query entered by a user at the device.

23. The method of claim 16, wherein the first word is included as a first label in metadata associated with a file and the method further comprises:
- adding the at least one second word as a second label in the metadata associated with the file, wherein the file may be searched for using the metadata.

* * * * *